UNITED STATES PATENT OFFICE.

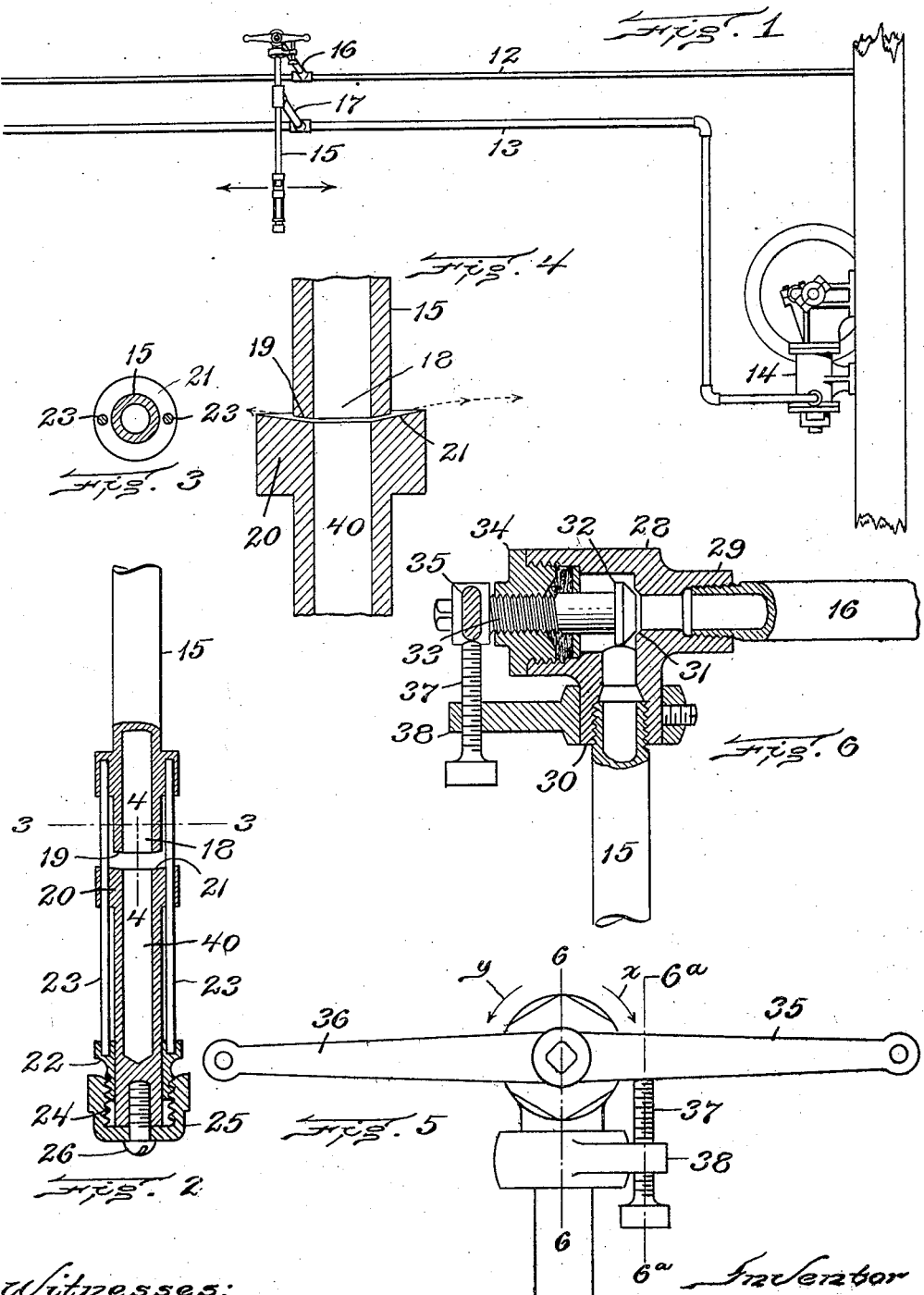

WILLIAM J. KELLEY, OF CENTRAL FALLS, RHODE ISLAND.

HUMIDIFYING APPARATUS.

No. 887,726.  Specification of Letters Patent.  Patented May 12, 1908.

Application filed January 10, 1908. Serial No. 410,197.

*To all whom it may concern:*

Be it known that I, WILLIAM J. KELLEY, of Central Falls, in the county of Providence, and State of Rhode Island, have invented certain new and useful Improvements in Humidifying Apparatus, of which the following is a specification.

This invention relates to that class of apparatus for moistening air, particularly in factories for treating textile materials, in which water and air under pressure are admitted simultaneously to a delivering conduit or nozzle, which is provided with means for causing the water to be distributed in the form of fine spray or fog by the air pressure, the delivering conduit being provided with a deflector which is opposed to the delivering end, so that the air and water impinge upon the deflector, and are distributed in the form of a fine spray or fog.

The invention has for its object to provide certain improvements in apparatus of this character, relating to the means for deflecting and distributing the air and water, and to the means for regulating the admission of water into the delivering conduit or nozzle.

The invention consists in the improvements which I will now proceed to describe and claim.

Of the accompanying drawings, forming a part of this specification,—Figure 1 represents an elevation showing a delivering conduit having deflecting or distributing means and liquid-controlling means embodying my invention. Fig. 2 represents a longitudinal section of a portion of the delivering conduit and the deflector. Fig. 3 represents a section on line 3—3 of Fig. 2. Fig. 4 represents an enlarged section on line 4—4 of Fig. 2, showing the deflector in its operative relation to the end of the delivering conduit. Fig. 5 represents an enlargement of a portion of Fig. 1. Fig. 6 represents a section on lines 6—6 and 6ª 6ª of Fig. 5.

The same letters of reference indicate the same parts in all the figures.

In the drawings 12 represents a liquid supply pipe, which is connected with a water main or other source of liquid supply under pressure.

13 represents an air supply pipe, through which air under pressure may be forced by means of an air pump 14 or any other suitable means.

15 represents a delivering conduit, which receives liquid from the pipe 12, and air from the pipe 13, the pipe 12 being connected with the said conduit by a branch 16, and the pipe 13 by a branch 17. The conduit 15 has an open delivering end 18 surrounded by an annular face 19 (Fig. 4).

20 represents the deflector, which has a face 21 opposed to the end face 19 and parallel therewith, the deflector being movable endwise toward and from the conduit 15, so that when the deflector is in its operative position, shown in Fig. 4, the faces 19 and 21 will form the sides of a narrow annular crevice through which water flowing through the conduit 15, will be forced outwardly in a thin circular sheet of fine spray or fog by air under pressure supplied to the said conduit.

The conduit 15 is provided with a cage, which is entirely external to the conduit, and is adapted to guide the deflector in its movements toward and from the open end of the conduit. Said cage, as here shown, includes a guide 22 and rods 23 23 rigidly connected to the guide and to the conduit, the guide being of annular form, and surrounding the elongated body of the deflector. The deflector body is movable in the guide toward and from the open end of the conduit, and means are provided for securing the deflector to the guide in any position to which the deflector is capable of being adjusted, said means, in this embodiment of my invention, including an external screw thread formed on the guide, and an internal screw thread 24 formed in a portion of the deflector, and engaging the external thread on the guide. The portion of the deflector on which the internal thread 24 is formed, is preferably a cup 25 connected with the body of the deflector by a screw 26, and adapted to be rotated to cause an endwise adjustment of the deflector.

When the apparatus is in operation, the deflector is brought into very close proximity to the open end of the conduit, as indicated in Fig. 4, so that the opposed faces 19 and 21 form an annular outlet crevice, the conducting capacity of which is much less than that of the open end 18 of the conduit 15, so that the compressed air supplied to the conduit, will be held back under a considerable degree of compression within the conduit, and will therefore pass through the restricted crevice with such force as to convert all the water passing through the conduit into fine spray or fog, and blow the same outwardly into the surrounding air without permitting the accumulation of water at any point on the exterior of the deflector, so that it is impossible for any water to collect on the deflector, and fall in drops into the space below it. This is an important result, because in apparatus of this kind the deflectors are generally located above space containing textile machinery, which would be very injuriously affected by drops of water falling upon it. The said result is due to the fact that the open end of the delivering conduit 15 is entirely unobstructed internally, the deflector being supported wholly by means external to the delivering conduit, so that the entire interior of the conducting capacity of the conduit is utilized in bringing air under pressure to the crevice formed by the opposed faces 19 and 21. The importance of means external to the conduit for supporting and guiding the deflector, will be appreciated when the fact is borne in mind that dropping of water from the deflector or distributer of a humidifying apparatus, even at comparatively infrequent intervals, is sufficient to condemn the apparatus, and prevent its use in a textile factory. The quantity of water admitted to the conduit 15 is relatively small, so that the communication between the water-admitting branch 16 and the conduit 15 must be suitably restricted, so that the water enters the conduit drop by drop, or in an extremely attenuated stream.

The branch 16 is connected with the conduit 15 by an elbow-shaped casing 28 having an arm 29 with which the branch 16 is connected, and an arm 30 with which the conduit 15 is connected, as shown in Fig. 6. The casing 28 has a valve seat 31 surrounding the liquid entrance into the casing, and a valve 32 which is movable toward and from said seat, the valve having a screw-threaded stem 33 engaged with a nut 34 forming a part of the casing. The rotation of the stem in said nut causes the valve to move toward and from the seat. The stem is provided with an operating lever having two arms 35 36 projecting in opposite directions from the stem, the outer ends of said arms being adapted to engage depending cords or chains by which the two-armed lever may be turned in either direction to move the valve toward or from its seat. 37 represents an adjustable stop, which is preferably a screw working in a tapped socket in a fixed support 38, said stop being arranged to limit the movement of the arm 35 in the direction indicated by the arrow $x$ in Fig. 5, this being the direction of movement required to move the valve toward its seat. The stop 37 is so adjusted that when the arm 35 abuts against it, the valve will be at the exact distance from the seat required to permit the desired restricted flow of water into the conduit 15. In case the passage between the valve and its seat becomes obstructed by sediment, the valve may be given a quick and ample opening movement by pulling down the arm 36 in the direction indicated by the arrow $y$, so that the valve may be opened momentarily to permit a flushing flow of water between the valve seat and the valve, after which the valve may be again returned to its operative position by pulling down the arm 35 against the stop 37.

The deflector 20 is preferably provided with a longitudinal cavity 40, which forms an air chamber, the mouth of which is surrounded by the face 21. This chamber contains an air cushion, which is compressed by the compressed air within the conduit 15, and materially aids in the distribution of the water in the form of spray or fog.

I do not limit myself to the details of construction here shown, as the same may be variously modified without departing from the spirit of my invention.

I claim:

1. A humidifying apparatus, comprising a delivering conduit having an open end and an unobstructed interior, a cage affixed to the conduit, and projecting from the open end thereof, said cage including a guide separated from the conduit, and a deflector adjustably engaged with the guide, and movable relatively thereto toward and from the open end of the conduit.

2. A humidifying apparatus comprising a delivering conduit having an open end and an unobstructed interior, a cage affixed to the conduit and projecting from the open end thereof, said cage including a screw-threaded guide which is separated from the conduit, and a deflector having a screw thread engaged with the thread on the guide, the deflector being movable relatively to the guide toward and from the open end of the conduit.

3. A humidifying apparatus comprising a delivering conduit having an open end and an unobstructed interior, a cage affixed to the conduit and projecting from the open end thereof, said cage including an annular, internally threaded guide which is separated from the conduit, and a deflector composed of an elongated body having at one end a rotatable internally threaded portion engaged with the external thread on the guide, the body being movable in the guide toward and from the open end of the conduit.

4. A humidifying apparatus comprising a delivering conduit having an open end and an unobstructed interior, a liquid supply pipe, a connection between said pipe and conduit having a valve seat, a valve, valve operating means having provisions for giving the valve a flushing movement, an adjustable stop coöperating with the said operating means in partially closing the valve to cause a predetermined restricted flow of liquid, an air supply pipe communicating with the conduit between the valve and the open end of the conduit, and means for distributing air and liquid admitted to the conduit.

5. A humidifying apparatus comprising a delivering conduit having an open end and an unobstructed interior, a liquid supply pipe, a connection between said pipe and conduit composed of an elbow-shaped casing, one arm of which has a valve seat, and is joined to the liquid pipe, while the other arm is joined to the delivering conduit, said casing having a valve seat, a valve having a screw-threaded stem engaged with a nut forming a part of the casing, a two-armed lever affixed to said stem, and adapted to turn the same in either direction to adjust the valve, an adjustable stop arranged to coöperate with one of said arms to limit the movement of the valve toward its seat, the lever being movable away from said stop to permit an opening movement of the valve, an air supply pipe communicating with the conduit between the casing and the open end of the conduit, means for forcing air into the conduit, a deflector opposed to the open end of the conduit, and means for adjustably supporting the deflector, the said supporting means and deflector having provisions for adjusting the deflector toward and from the open end of the conduit.

6. A humidifying apparatus comprising a delivering conduit having an open end and an unobstructed interior, a cage affixed to the conduit, and projecting from the open end thereof, said cage including a guide separated from the conduit, and a deflector adjustably engaged with the guide, and movable relatively thereto toward and from the open end of the conduit, the said deflector having an air chamber with an open end surrounded by the end of the deflector.

In testimony whereof I have affixed my signature, in presence of two witnesses.

WILLIAM J. KELLEY.

Witnesses:
WM. H. GOLDSMITH,
JOHN H. BARBER.